(12) United States Patent
Lindsay (10) Patent No.: US 9,566,901 B1
(45) Date of Patent: Feb. 14, 2017

(54) VEHICLE INDICATING SIDE MARKER LIGHTING SYSTEMS

(71) Applicant: Toyota Motor Engineering & Manufacturing North America, Inc., Erlanger, KY (US)

(72) Inventor: Brian L. Lindsay, Ann Arbor, MI (US)

( * ) Notice: Subject to any disclaimer, the term of this patent is extended or adjusted under 35 U.S.C. 154(b) by 0 days.

(21) Appl. No.: 15/145,094

(22) Filed: May 3, 2016

(51) Int. Cl.
*B60Q 1/14* (2006.01)
*B60Q 1/32* (2006.01)
*B60Q 1/24* (2006.01)
*H05B 37/02* (2006.01)
*H05B 33/08* (2006.01)
*B60Q 1/00* (2006.01)

(52) U.S. Cl.
CPC ............... *B60Q 1/32* (2013.01); *B60Q 1/0023* (2013.01); *B60Q 1/24* (2013.01); *H05B 33/0854* (2013.01); *H05B 37/0218* (2013.01); *H05B 37/0227* (2013.01)

(58) Field of Classification Search
CPC .................................... B60Q 1/32; B60Q 1/24
USPC ................... 362/506; 315/77; 307/10.1, 10.8
See application file for complete search history.

(56) References Cited

U.S. PATENT DOCUMENTS

| 6,858,986 B2* | 2/2005 | Monk | B60Q 1/2611 307/10.8 |
|---|---|---|---|
| 8,274,397 B2* | 9/2012 | Wilson | B60Q 1/2611 315/312 |
| 9,242,596 B2 | 1/2016 | Thomson | |
| 2009/0248251 A1 | 10/2009 | Sugimoto | |
| 2012/0191298 A1 | 7/2012 | Schwarzhaupt et al. | |
| 2015/0203026 A1 | 7/2015 | Schotanus | |

FOREIGN PATENT DOCUMENTS

| DE | 10336681 A1 | 3/2005 |
|---|---|---|
| DE | 102006038915 A1 | 2/2008 |
| JP | 2007230505 A | 9/2007 |

OTHER PUBLICATIONS

Amber LED Side Marker Light with Bracket; https://addonaccessories.net/lights/I22-6510a-amber-led-side-marker-light-with-bracket.html; Feb. 24, 2016.

* cited by examiner

*Primary Examiner* — Thuy Vinh Tran
(74) *Attorney, Agent, or Firm* — Dinsmore & Shohl LLP (57) ABSTRACT

Side marker lighting systems, methods of providing side marker lighting, and vehicles including the same are disclosed. A side marker lighting system includes a light emitting module having a plurality of light emitting diodes, a sensor module, and a master controller having instructions to receive data from the sensor module, where the data is indicative of a vehicle located in the vicinity of the side marker lighting system, determine that the vehicle is moving toward the system at an angle, determine location coordinates of the vehicle with respect to the system, determine a direction of light based on the location coordinates of the vehicle such that the direction of light is aimed at the vehicle, and direct the light emitting module to selectively activate the light emitting diodes such that the light emitting diodes produce a collective beam that corresponds to the first direction.

20 Claims, 8 Drawing Sheets

VEHICLE INDICATING SIDE MARKER LIGHTING SYSTEMS

TECHNICAL FIELD

The present specification generally relates to vehicle identification systems and, more specifically, to a vehicle system that illuminates other vehicles that approach the vehicle system from particular angles.

BACKGROUND

Occasionally when piloting a vehicle, it may be difficult for drivers (or autonomous driving systems) to see and/or ascertain movement of a vehicle when approaching the vehicle at particular angles. This issue is exasperated particularly in low light situations (e.g., at nighttime) and/or in situations where visibility is limited, such as inclement weather situations. The inability to see other vehicles at certain angles and/or the inability to ascertain the vehicle's movement may cause accidents to occur.

Accordingly, a need exists for a vehicle identification system that highlights the presence of approaching and/or adjacent vehicles.

SUMMARY

In one embodiment, a side marker lighting system includes a light emitting module having a plurality of light emitting diodes, a sensor module, and a master controller configured to receive data from the sensor module, where the data is indicative of a vehicle located in the vicinity of the side marker lighting system, determine that the vehicle is moving toward the side marker lighting system at an angle, determine location coordinates of the vehicle with respect to the side marker lighting system, determine a direction of light based on the location coordinates of the vehicle such that the direction of light is aimed at the vehicle, and direct the light emitting module to selectively activate the plurality of light emitting diodes such that the plurality of light emitting diodes produce a collective beam that corresponds to the first direction.

In another embodiment, a method of providing side marker lighting includes receiving, by a master controller of a side marker lighting system, data from a sensor module, where the data is indicative of a vehicle located in the vicinity of the side marker lighting system, determining, by the master controller, that the vehicle is moving toward the side marker lighting system at an angle, determining, by the master controller, location coordinates of the vehicle with respect to the side marker lighting system, determining, by the master controller, a direction of light based on the location coordinates of the vehicle such that the direction of light is aimed at the vehicle, and directing, by the master controller, a light emitting module to selectively activate a plurality of light emitting diodes such that the plurality of light emitting diodes produce a collective beam that corresponds to the first direction.

In yet another embodiment, a first vehicle having a side marker lighting system, the side marker lighting system including a light emitting module having a plurality of light emitting diodes and an LED controller for selectively activating one or more of the plurality of light emitting diodes in a pattern to produce a particularly aimed collective beam of light, a sensor module, and a master controller having a processing device and a non-transitory, processor-readable storage medium. The non-transitory, processor-readable storage medium includes one or more programming instructions that, when executed, cause the processing device to receive data from the sensor module, where the data is indicative of a second vehicle located in the vicinity of the first vehicle, determine that the second vehicle is moving toward the first vehicle at an oblique angle, determine first location coordinates of the second vehicle with respect to the first vehicle, determine a first direction of light based on the first location coordinates of the second vehicle such that the first direction of light is aimed at the second vehicle, direct the LED controller to selectively activate the plurality of light emitting diodes such that the plurality of light emitting diodes produce a collective beam that corresponds to the first direction, and when the second vehicle moves with respect to the first vehicle to an area outside of the direction of the beam of light, determine second location coordinates of the second vehicle with respect to the first vehicle, determine a second direction of light based on the second location coordinates such that the second direction of light is aimed at the second vehicle, and direct the light emitting module to selectively activate the plurality of light emitting diodes such that the plurality of light emitting diodes produce the collective beam that corresponds to the second direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein are generally directed to a side marker lighting system that detects adjacent and/or approaching vehicles, particularly vehicles that are approaching the sides of a vehicle in which the side marker lighting system is installed, and projects a movable beam of light onto the other vehicle. In addition, the side marker lighting system described herein can reposition the beam of light such that the light beam is maintained on the other vehicle as it moves with respect to the vehicle in which the side marker lighting system is installed. The movable beam of light may be projected with a deluminated zone therein, where the deluminated zone does not contain projected light, so as to avoid temporarily blinding a driver of the other vehicle.

Side marker lighting used in vehicles is generally fixed in a particular position, thereby emitting light in a fixed direction. As such, this light may be difficult to see or ascertain by an approaching vehicle at certain angles, particularly oblique angles. As such, the present disclosure relates to a side marker light that contains one or more components for moving the beam of light emitted from the side marker lamp such that the light is aimed directly at the approaching vehicle, and may continue to move as the vehicle changes position with respect to the vehicle in which the side marker light is installed. In addition, the side marker light as disclosed herein is a part of a side marker lighting system, which further includes one or more sensors that sense the location of the approaching vehicle and/or a control device that receives information from the one or more sensors and transmits movement instructions to the side marker light.

Figure 1:
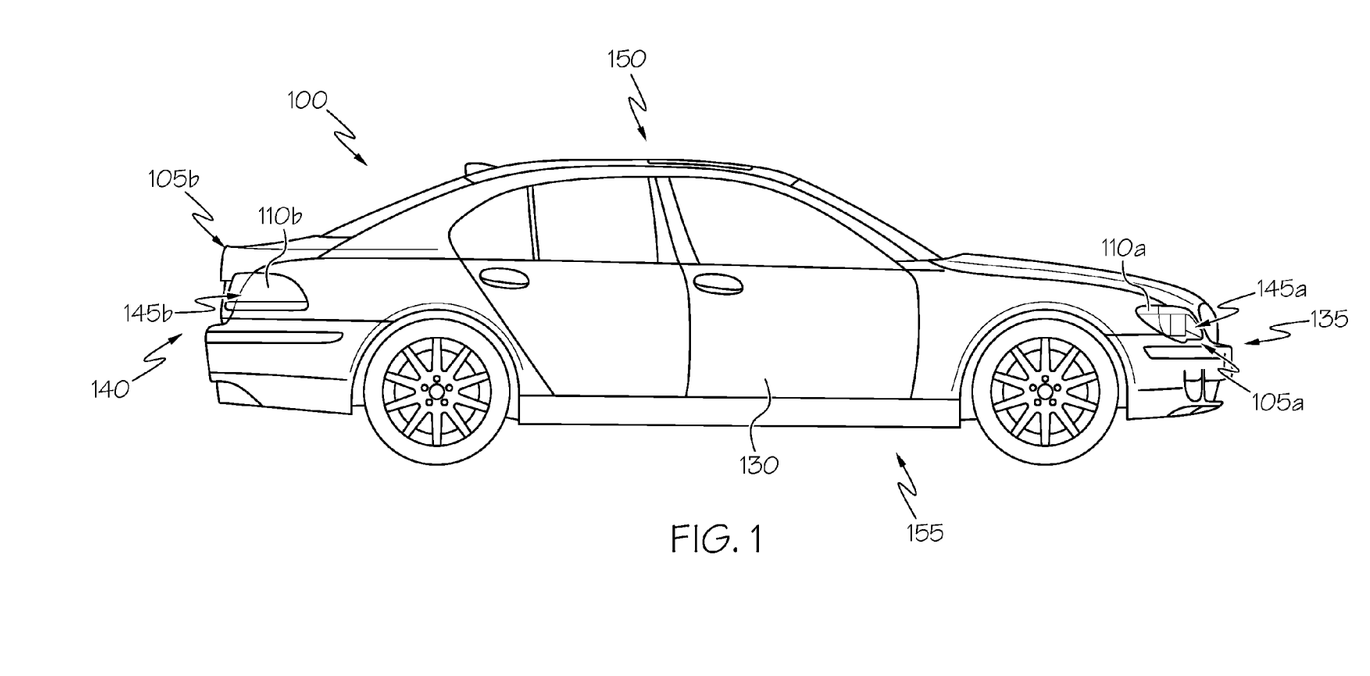
FIG. 1 depicts a side perspective view of an illustrative vehicle with a side marker lighting system according to one or more embodiments shown and described herein.
Figure 2:
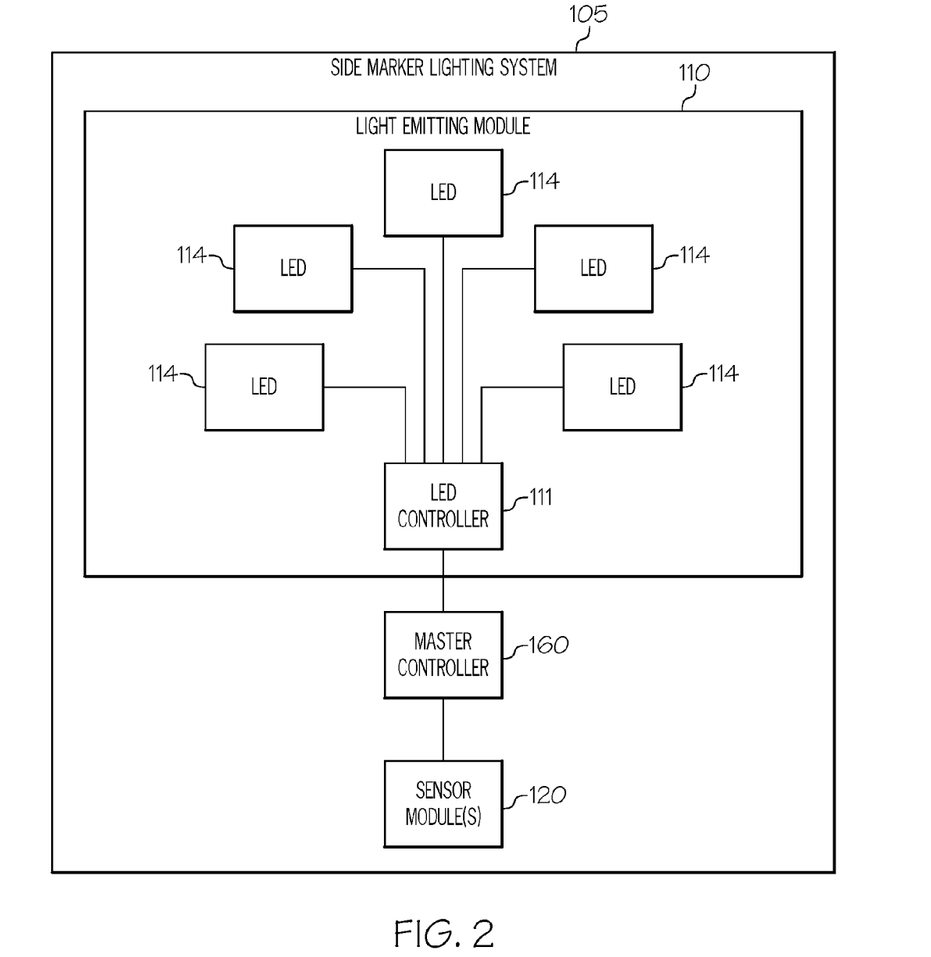
FIG. 2 depicts a schematic block diagram of an illustrative side marker lighting system according to one or more embodiments shown and described herein.

FIG. 1 depicts an illustrative vehicle, generally designated 100, containing at least one front side marker lighting system 105a and at least one rear side marker lighting system 105b, which are collectively referred to as side marker lighting systems 105 or generically referred to as a side marker lighting system 105. The front side marker lighting system 105a generally includes one or more front light emitting modules 110a. Similarly, the rear side marker lighting system 105b generally includes one or more rear light emitting modules 110b. Each of the front light emitting modules 110a and the rear light emitting modules 110b may collectively be referred to herein as light emitting modules 110 and generically referred to as a light emitting module 110. Referring also to FIG. 2, each of the side marker lighting systems 105 may also include one or more sensor modules 120 and a master controller 160. As will be described in greater detail herein, each of the side marker lighting systems 105 may function such that the one or more sensor modules 120 sense a presence and/or location of another vehicle, the master controller 160 determines an appropriate illumination and transmits one or more control signals to the one or more light emitting modules 110, and the one or more light emitting modules 110 illuminate the other vehicle based on the transmitted control signals.

In general, each of the components of the side marker lighting systems 105 may be located on a side 130 of the vehicle 100. However, such a location is merely illustrative. That is, in other embodiments, certain components of the side marker lighting systems 105 (such as the one or more sensor modules 120) may be located elsewhere with respect to the vehicle 100. The light emitting modules 110 are located at positions on the vehicle 100 that may be mandated by a governing body as an acceptable position for a side marker light. In addition, the various components of the side marker lighting system 105 may be particularly positioned in a location where the light emitting module 110 can emit a beam of light on another vehicle, as described in greater detail herein. In some embodiments, certain components of the side marker lighting systems 105, particularly one or more of the sensor modules 120, may be located on a front 135 of the vehicle 100, a rear 140 of the vehicle 100, at a top 150 of the vehicle 100, and/or at a bottom 155 of the vehicle 100. In some embodiments, the side marker lighting systems 105 (and/or a component thereof) may be integrated into existing components of the vehicle 100, as described in greater detail herein. In other embodiments, the side marker lighting systems 105 and/or components thereof may be standalone units integrated with the vehicle 100, not integrated into existing components.

While FIG. 1 depicts a single front side marker lighting system 105a and a single rear side marker lighting system 105b, it should be understood that the present disclosure is not limited to two side marker lighting systems 105, and that greater or fewer side marker lighting systems 105 may be used without departing from the scope of the present disclosure. For example, in some embodiments, the vehicle 100 may include two front side marker lighting systems 105a and/or two rear side marker lighting systems 105b on either side of the vehicle 100. In some embodiments, the various side marker lighting systems 105 on one side of the vehicle 100 may work in tandem with each other to detect, track, and illuminate another vehicle, as described in greater detail herein. In other embodiments, the various side marker lighting systems 105 may work independently of one another to detect, track, and illuminate another vehicle, particularly in instances where multiple other vehicles are present.

In some embodiments, portions of the front side marker lighting system 105a may be shared with the rear side marker lighting system 105b. For example, the front side marker lighting system 105a may share the same sensor modules 120 with the rear side marker lighting system 105b such that the sensor modules 120 sense a vehicle approaching at an angle and transmit signals that are used to adjust the direction of the light emitted from both the front light emitting module 110a and the rear light emitting module 110b.

In some embodiments, each of the side marker lighting systems 105 may include a light emitting module 110a, 110b and a corresponding sensor module 120. For example, as shown in FIG. 1, each of the side marker lighting systems 105 may be wholly contained on or near a headlamp assembly 145a or a vehicle tail lamp assembly 145b. However, various components of each of the side marker lighting systems 105 may be located elsewhere. For example, in some embodiments, the front light emitting module 110a may be located on the headlamp assembly 145a whereas the sensor module 120 is located at another location on the vehicle, such as at another location on the side 130 of the vehicle 100, the front 135 of the vehicle 100, and/or the rear 140 of the vehicle 100. For example, the sensor module 120 may be part of any object detecting system of the vehicle 100 that uses one or more computing devices, such as any type of a electronic control unit (ECU), handheld, desktop, or other computing device, or multiple computing devices. Such a configuration may allow, for example, each of the side marker lighting systems 105 to effectively detect another vehicle and accurately illuminate the other vehicle.

Referring particularly to FIG. 2, each of the light emitting modules 110 is generally a device or apparatus that selectively emits a collective beam of light in a particular direction therefrom and automatically changes the aim of the collective beam of light, such as, for example, in response to a moving vehicle without any physical movement thereof. To achieve such a functionality, each of the light emitting modules 110 may include one or more light emitting diodes (LEDs) 114 and an LED controller 111.

The LED controller 111 is a device that selectively provides an on or an off signal to each of the LEDs 114 to cause each of the LEDs 114 to independently activate or deactivate according to a chosen lighting pattern. As such, each of the LEDs is controllable independently from one another. In some embodiments, the LEDs 114 may be controlled in one or more groups (e.g., an array of LEDs 114). In some embodiments, the LEDs 114 may be controlled individually.

To individually control each of the LEDs 114, the LED controller 111 may be a control device that is communicatively and/or electrically coupled to each of the LEDs 114 such that the LED controller 111 can control electrical power supplied to each of the LEDs 114 and/or transmit activation/deactivation signals to each of the LEDs 114. Illustrative examples of the LED controller 111 include, but are not limited to, a processing device and associated non-transitory, processor-readable memory, a voltage controlled variable resistor, or the like.

Figure 3:
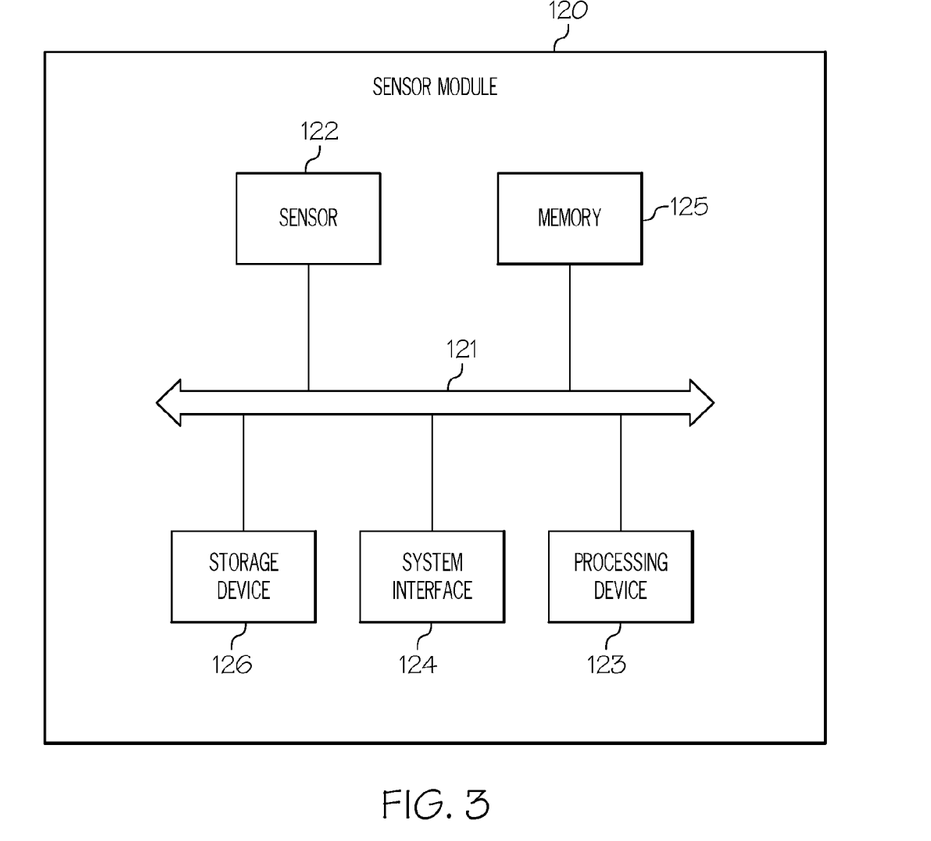
FIG. 3. depicts a schematic block diagram of illustrative components of a sensor module according to one or more embodiments shown and described herein.

Referring to FIG. 2, each of the one or more sensor modules 120 may generally be a unit that continuously senses and detects objects adjacent to and/or approaching the vehicle 100. In addition, each of the one or more sensor modules 120 may be a unit that can distinguish between a moving vehicle and other nonmoving objects, such as nonmoving vehicles, trees, mailboxes, buildings, and the like, even when the vehicle 100 is in motion. Illustrative hardware components of each of the one or more sensor modules 120 are depicted in FIG. 3. A bus 121 may interconnect the various components. A processing device 123, such as a computer processing unit (CPU) may be the central processing unit of the sensor module 120, performs calculations and logic operations that may be necessary to execute one or more program steps. The processing device 123, alone or in conjunction with the other devices disclosed in FIG. 3, is an illustrative processing device, computing device, processor, or combination thereof, as such terms are used within this disclosure. While the processing device 123 is shown as part of the sensor module 120, the processing device 123 may be used by any object detection system of the vehicle 100, such as any one or more of a vehicle ECU, handheld, desktop, or other computing device. Memory 125, such as (but not limited to) read only memory (ROM) and random access memory (RAM), may constitute illustrative memory devices (i.e., non-transitory, processor-readable storage media). Such memory 125 may include one or more programming instructions thereon that, when executed by the processing device 123, cause the processing device 123 to complete various processes, such as the processes described herein.

A storage device 126, which may generally be a storage medium that is separate from the memory 125, may contain a repository for storing images and information as described herein. The storage device 126 may be any physical storage medium, including, but not limited to, a hard disk drive (HDD), memory, removable storage, and/or the like. While the storage device 126 is depicted as a local device, it should be understand that the storage device may be a remote storage device, such as a storage device that is also used to store data for other vehicle components, other side marker lighting system components, a server computing device, or the like.

A system interface 124 may generally provide the sensor module 120 with an ability to interface with one or more other components of the side marker lighting system 105 (FIG. 1) or other vehicle components and/or systems. Communication may occur using various communication ports (not shown). An illustrative communication port may be attached to a communications network, such as a vehicle communications network, a side marker lighting system network, a direct connection, and/or the like.

The sensor module 120 may utilize any one or more sensors 122 communicatively coupled to the processing device 123 for detecting an object. The one or more sensors 122 may be used in conjunction with vehicle-to-vehicle communication or alone. The one or more sensors 122 can include, but are not limited to, imaging devices (e.g., cameras), light detection and ranging (LIDAR) systems, RADAR systems, and proximity sensors. Multiple types of sensors 122 can be used to provide a variety of information regarding areas adjacent to the vehicle 100.

As mentioned hereinabove, in some embodiments, the one or more sensors 122 may include an imaging device, which is generally any device that can image an area adjacent to the vehicle 100 (FIG. 1). Nonlimiting examples of an imaging device include cameras, motion detectors, and/or the like. The imaging device may be arranged such that a field of view of the imaging device includes at least a portion of the area adjacent to the vehicle 100 to be imaged. In some embodiments, the field of view includes the entire area adjacent to the vehicle 100 to be imaged. In other embodiments where the field of view does not include the entire area adjacent to the vehicle 100 to be imaged, the imaging device may be movable (e.g., via a motor or the like) to capture the entire area. The imaging device may be particularly configured to determine a location (e.g., a distance and/or a positioning) of another vehicle and provide location coordinates corresponding to the other vehicle's location. In addition, the imaging device may include any additional components generally recognized as being suitable for imaging the area, including, but not limited to, an image sensor, a lens, one or more movement mechanisms, and/or the like.

Referring also to FIG. 1, the various components depicted in FIG. 3 may generally provide each of the one or more sensor modules 120 with a capability of continuously imaging one or more areas adjacent to the vehicle 100 and based on the continuous imaging, determining if other vehicles are adjacent to the vehicle 100 and/or are moving toward the vehicle 100. For example, the processing device 123 may continuously obtain data from the one or more sensors 122, access the storage device 126 to retrieve stored data, and compare the stored data with obtained images to determine whether the obtained images contain a moving vehicle or the like. If the processing device 123 determines that the images contain a moving vehicle, the vehicle's location may be determined and location coordinates of the vehicle may be continuously transmitted, as described in greater detail herein.

Each of the sensor modules 120 may be communicatively coupled to various other components, including components depicted in FIGS. 1 and 2. For example, each of the sensor modules may be communicatively coupled other components of the side marker lighting systems 105, including the master controller 160 and/or the LED controller 111.

The master controller 160 is generally a control device that receives one or more signals from the one or more sensor modules 120, determines that another vehicle is approaching the vehicle 100, determines the location of the other vehicle, and transmits instructions to the LED controller 111 indicating a direction of the light to be emitted from the LEDs 114 such that a beam of light illuminates the other vehicle.

Figure 4:
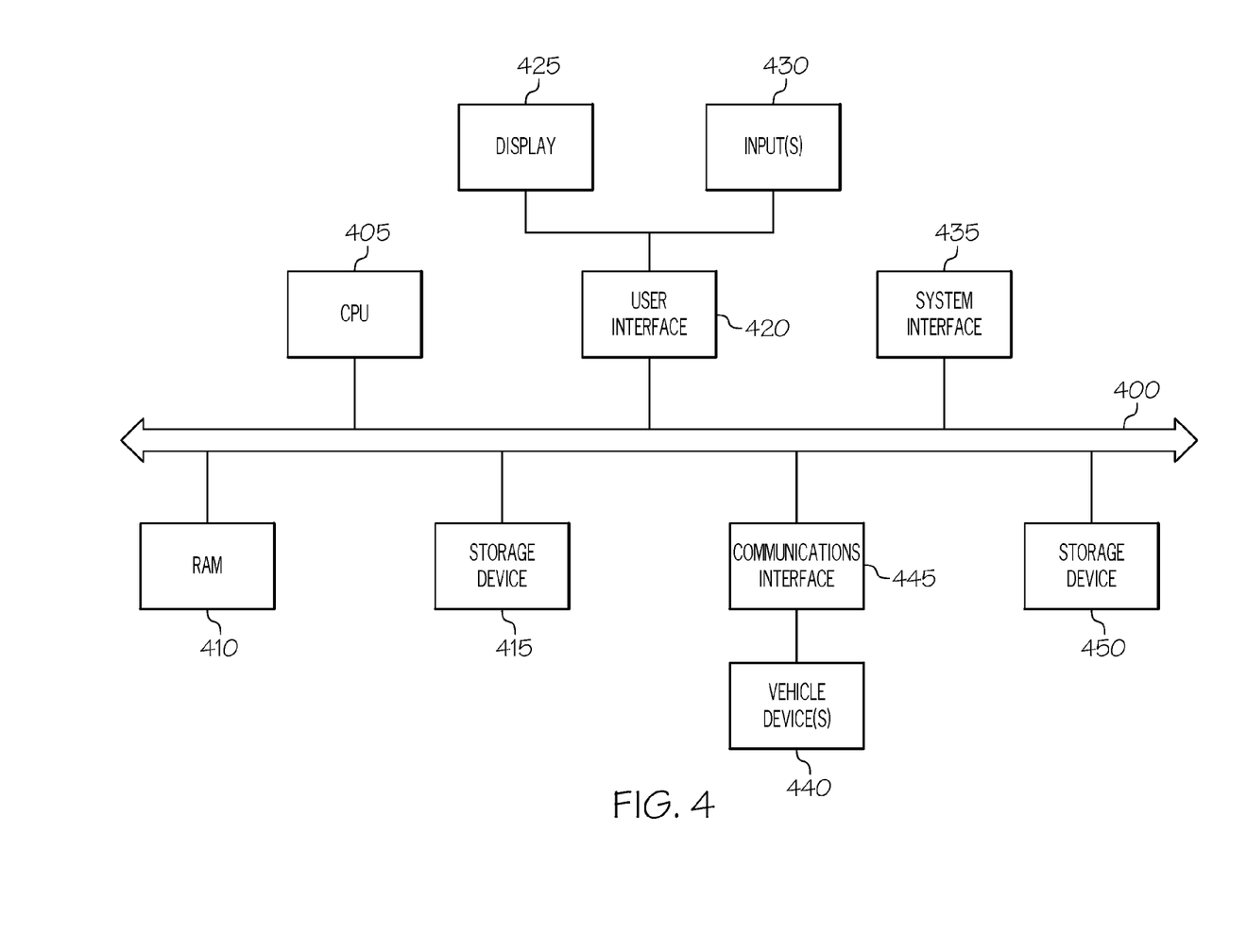
FIG. 4 depicts a schematic block diagram of illustrative computer processing hardware components according to one or more embodiments shown and described herein.

The master controller 160 may also include a plurality of hardware components, particularly components that allow the master controller 160 to receive and monitor data from the sensor modules 120, determine the status of another vehicle, and transmit instructions to the LED controller 111 as described herein. Illustrative hardware components of the master controller 160 are depicted in FIG. 4. A bus 400 may interconnect the various components. A processing device, such as a computer processing unit (CPU) 405, may be the central processing unit of the computing device, performing calculations and logic operations required to execute a program. The CPU 405, alone or in conjunction with one or more of the other elements disclosed in FIG. 4, is an illustrative processing device, computing device, processor, or combination thereof, as such terms are used within this disclosure. Memory, such as read only memory (ROM) 415 and random access memory (RAM) 410, may constitute illustrative memory devices (i.e., non-transitory processor-readable storage media). Such memory 410, 415 may include one or more programming instructions thereon that, when executed by the CPU 405, cause the CPU 405 to complete various processes, such as the processes described herein. Optionally, the program instructions may be stored on a tangible computer-readable medium such as a compact disc, a digital disk, flash memory, a memory card, a USB drive, an optical disc storage medium, such as a Blu-ray™ disc, and/or other non-transitory processor-readable storage media.

A storage device 450, which may generally be a storage medium that is separate from the RAM 410 and the ROM 415, may contain a repository or the like for storing the various information, and features described herein. For example, the storage device 450 may store information regarding vehicle positioning that is received from various vehicle components, such as the one or more sensor modules 120 (FIG. 1). The storage device 450 may be any physical storage medium, including, but not limited to, a hard disk drive (HDD), memory, removable storage, and/or the like. While the storage device 450 is depicted as a local device, it should be understood that the storage device 450 may be a remote storage device, such as, for example, a remote server computing device or the like.

An optional user interface 420 may permit information from the bus 400 to be displayed on a display 425 portion of the vehicle 100 (FIG. 1) in audio, visual, graphic, or alphanumeric format. Moreover, the user interface 420 may also include one or more inputs 430 that allow for transmission to and receipt of data from input devices such as a keyboard, a mouse, a joystick, a touch screen, a remote control, a pointing device, a video input device, an audio input device, a haptic feedback device, and/or the like. Such a user interface 420 may be used, for example, to allow a user to interact with the master controller 160, such as to receive information regarding vehicles located in a blind spot, to change various settings of each of the side marker lighting systems, and/or the like.

A system interface 435 may generally provide the master controller 160 with an ability to interface with one or more of the components of the side marker lighting system, including, but not limited to, one or more LED controllers and one or more sensor modules. Communication with the components of the side marker lighting system may occur using various communication ports. An illustrative communication port may be attached to a communications network, such as an intranet, a local network, a direct connection, and/or the like.

A communications interface 445 may generally provide the master controller with an ability to interface with one or more one or more vehicle components 440 that are external to the side marker lighting system, such as, for example, any sensors, gauges, electronic control units (ECU), and/or the like. Communication with vehicle components 440 may occur using various communication ports. An illustrative communication port may be attached to a communications network, such as the Internet, an intranet, a local network, a direct connection, and/or the like.

Figure 5A:
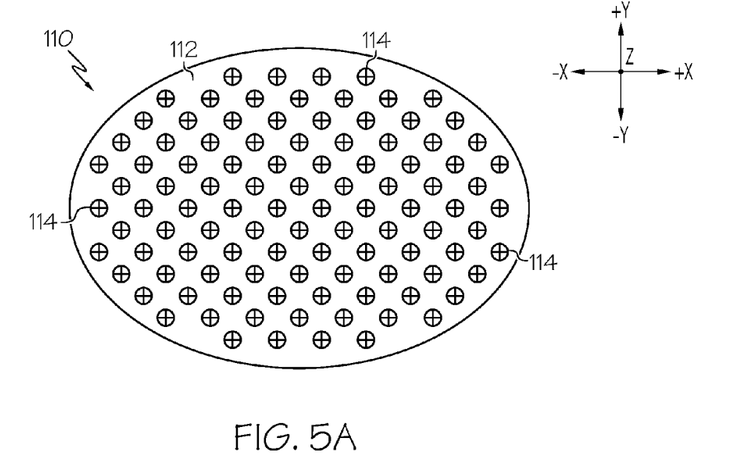
FIG. 5A depicts a front view of an illustrative light emitting module of a side marker lighting system according to one or more embodiments shown and described herein.
Figure 5B:
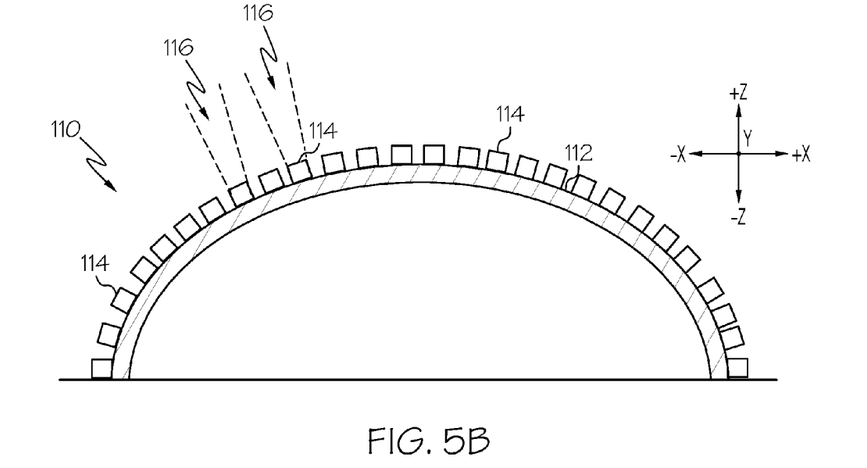
FIG. 5B depicts a cutaway top view of an illustrative light emitting module of a side marker lighting system according to one or more embodiments shown and described herein.

FIGS. 5A and 5B depict various views of an illustrative light emitting module 110 according to various embodiments. As shown in FIGS. 5A and 5B, the light emitting module 110 may include a surface 112 that supports the plurality of LEDs 114 arranged thereon. As such, the surface 112 may be a substrate supporting the plurality of LEDs 114.

The dimensional aspects of the surface 112 are not limited by this disclosure, and as such, the surface 112 may generally be any size and/or shape. In some embodiments, the surface 112 may be sized and/or shaped to support the plurality of LEDs 114 thereon. For example, as shown in FIG. 5B, the surface 112 may have a convex shape. However, it should be understood that the shape is merely illustrative, and other shapes, whether regular or irregular, are contemplated.

Each of the LEDs 114 is a solid state device that, when activated, emits light from a p-n junction. That is, when a voltage is applied to a lead of each of the LEDs 114, electrons recombine with electron holes within the device, which releases energy in the form of photons. The LEDs 114 described herein may each emit any color of light. For example, in some embodiments, the LEDs 114 may each emit a white or substantially white light. In another example, the LEDs 114 may emit light that corresponds to a color generally recognized for side marker lighting applications, including amber and red colors. That is, LEDs 114 that are arranged in the front side marker system 105a (FIG. 1) may emit amber light and LEDs 114 that are arranged in the rear side marker system 105b (FIG. 1) may emit red light. Alternatively, the LEDs 114 may emit a particular color of light, which may be tuned by a filter, a lens, or the like to a different color according to a particular application. In addition, the LEDs 114 described herein may emit the light at a brightness that is sufficient to illuminate another vehicle that is adjacent to the vehicle 100 in darkness or low light conditions.

The number of LEDs 114 arranged on the surface 112 of each light emitting module 110 is not limited by this disclosure, and may generally be any number of LEDs 114. Each of the LEDs 114 may be particularly arranged on the surface 112 of the light emitting module 110 such that each of the LEDs 114 emits light that is aimed in a particular direction. As will be described in greater detail herein, such a particular arrangement allows for a selective activation/deactivation of each of the LEDs 114 to particularly aim and move a beam of light. In some embodiments, each of the LEDs 114 may be particularly positioned with respect to the surface 112. In some embodiments, all of the LEDs 114 may be positioned in the same manner with respect to the surface 112, whereby the curvature of the surface results in light emitted from each of the LEDs 114 aimed in a different direction. In some embodiments, the LEDs 114 may be arranged in a particular pattern on the surface. For example, the LEDs 114 may be arranged in a grid-like formation. The LEDs 114 may also be arranged in a tightly packed configuration on the surface 112 (e.g., the LEDs 114 contact one another) or may be arranged in a spaced configuration on the surface 112 such that a space exists between two or more LEDs 114.

As particularly shown in FIG. 5B, the surface 112 may be curved such that the LEDs 114 coupled thereto are particularly positioned according to the curvature of the surface 112, which ensures a particular positioning of each of the LEDs 114. The curvature of the surface 112 is not limited by this disclosure, and may be curved in any direction. For example, in some embodiments, the surface 112 may be hemispherical in shape, causing a convex surface 112 that extends outwardly along the +X/−X axes of the coordinate axes depicted in FIG. 5B and outwardly along the +Z/−Z axes of the coordinate axes depicted in FIG. 5B. As such, the convex surface 112 allows each of the LEDs 114 positioned thereon to project a beam of light outwardly in a particular direction, as indicated by the areas 116 bounded by the dashed lines. In addition, the particular direction of the beam of light emitted by each of the LEDs 114 is different for each of the LEDs 114. When the LEDs 114 are arranged in such a manner, the collective beam of light emitted from all of the LEDs 114 may be emitted in every direction at least 180 degrees from the surface 112.

Figure 5C:
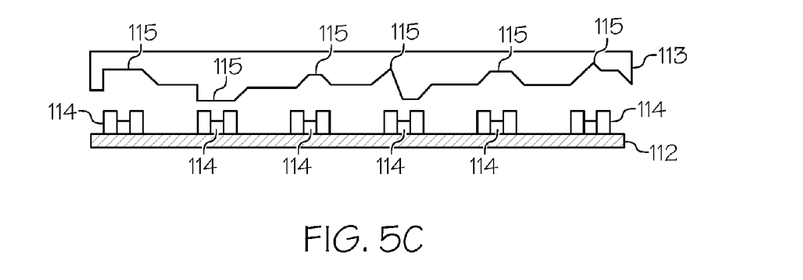
FIG. 5C depicts a cutaway top view of an alternative light emitting module having a lens system according to one or more embodiments shown and described herein.

In an alternative configuration, as shown in FIG. 5C, the LEDs 114 may be arranged on a substantially planar surface 112 (e.g., a planar substrate). In such embodiments, one or more lenses 113 may be positioned over the LEDs 114 such that light projected from the LEDs 114 is transmitted through the lens 113. The lens 113 may be any lens or lens-like structures now known or later developed. That is, the lens 113 may be any component that redirects, focuses, scatters, changes the color, changes the polarity, and/or changes the intensity of the light beam emitted from each of the LEDs 114. In some embodiments, the lens 113 may have one or more features 115 (e.g., optical elements or the like) that direct the light emitted from a corresponding LED 114 such that the resultant light, as it exits the lens 113, is aimed in a particular direction. As such, while all of the LEDs 114 may be facing in the same direction (and thereby emitting light in the same direction), the features 115 of the lens 113 allow the light to be redirected in particular directions such that each of the resulting light beams exiting from the lens are directed in different directions with respect to one another.

In some embodiments, instead of selectively activating the LEDs 114, moving the direction of the light emitted from the light emitting module 110 may be completed with a light source mounted to a movement mechanism. For example, the light source may be one or more of the LEDs 114 and the movement mechanism may include one or more motors, activators, movable surfaces, and/or the like that can be controlled to particularly aim the direction of the light emitted by the light source. In such embodiments, the light source may emit light in a particular direction and the surface upon which the light source is mounted is moved to change the direction of the emitted light accordingly.

Figure 6:
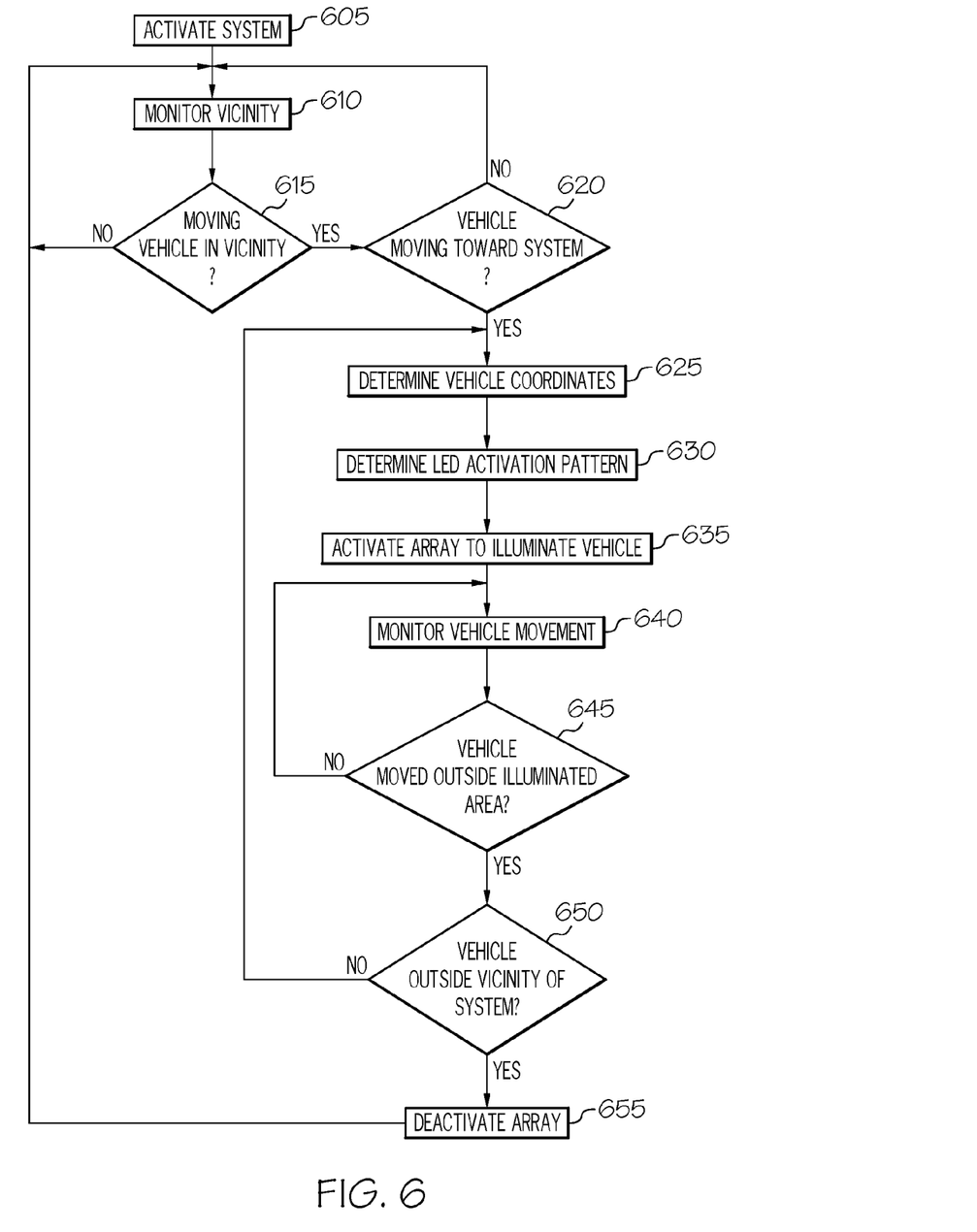
FIG. 6 depicts a flow diagram of an illustrative method of detecting a vehicle and providing side marker lighting according to one or more embodiments shown and described herein.

Referring now to FIG. 6, each of the side marker lighting systems described with respect to FIGS. 1-5B may be configured to detect a moving vehicle that is approaching the vehicle in which the systems are installed, and project a beam of light from one or more of the light emitting modules that is directed at the approaching vehicle. In addition, each of the side marker lighting systems described with respect to FIGS. 1-5B may selectively activate the LEDs within the light emitting modules to ensure that the beam of light emitted from the light emitting modules is appropriately directed and/or does not shine in the face of the driver of the approaching vehicle. Moreover, each of the side marker lighting systems described with respect to FIGS. 1-5B may selectively activate the LEDs within the light emitting modules to move the emitted beam of light as the location of the approaching vehicle changes with respect to the vehicle in which the side marker lighting systems are installed.

As shown in FIG. 6, while also referring to FIGS. 1-2, at step 605, one or more of the side marker lighting systems 105 may be activated. For example, the side marker lighting systems 105 may activate when the vehicle 100 is turned on, when a particular ambient light level is detected (e.g., nighttime or low light conditions), when a particular switch is activated (e.g., the driver activates the headlights), and/or the like. Activation of the side marker lighting systems 105 according to step 605 may be omitted in some embodiments, such as, for example, embodiments where the side marker lighting systems 105 operate as "always on" systems.

At step 610, the vicinity of the vehicle 100 may be monitored for approaching vehicles. That is, the side marker lighting systems 105 may receive data at the one or more sensor modules 120 and determine whether another vehicle is approaching at an angle based on the obtained data at step 615. That is, the received data may be indicative of whether another vehicle is located in the vicinity. As such, the one or more sensor modules 105 may sense an area adjacent to the vehicle 100 and transmit the sensed data to the master controller 160, which makes a determination as to whether another moving vehicle exists. In other embodiments, the determination may be completed by logic contained within one or more of the sensor modules 105. In such embodiments, the one or more sensor modules 105 may transmit the determination to the master controller 160 for further determination and/or decision making.

If the determination at step 615 is that another vehicle is not approaching, the process may return to step 610 to continue monitoring. If the determination at step 615 is that another vehicle is approaching, an additional determination may be made as to the direction of the movement of the other vehicle at step 620. That is, at step 620, a determination may be made as to whether the other vehicle is moving toward the vehicle 100 in which the one or more side marker lighting systems 105 are installed. Similar to the determination at step 615, the determination at step 620 may be completed by the one or more sensor modules 120 and/or the master controller 160. If the other vehicle is not moving towards the vehicle 100 in which the one or more side marker lighting systems 105 are installed (e.g., the other vehicle is moving at an angle away from the vehicle 100), the process may return to step 610 for additional monitoring.

If the other vehicle is moving towards the vehicle 100, the one or more side marker lighting systems 105 may determine the coordinates of the other vehicle with respect to the vehicle 100 (e.g., location coordinates) at step 625. Such a determination may include, for example, determining the other vehicle's coordinates with respect to a particular one of the side marker lighting systems 105 that will be activated. For example, if the other vehicle that is approaching is behind and to the right of the vehicle 100, the determination at step 625 may be made with respect to the rear side marker lighting system 105b that is mounted on a passenger side of the vehicle. In embodiments where the sensor module 120 is not located with the other components of the side marker lighting system 105, a calculation may be necessary to determine the coordinates based on the location of the other components of the side marker lighting system 105, such as an accounting of the distance and location relative to each other for the sensor module 120 and the other components of the side marker lighting system 105.

Such a determination at step 625 may generally be completed by any method of sensing the other vehicle location and mapping the other vehicle that is now known or later developed. For example, determining the vehicle coordinates may include receiving data from the one or more sensor modules 120 and mapping the location of the other vehicle to coordinate axes based on the received data.

Once the exact location of the other vehicle has been determined (e.g., a determination of location coordinates), the system may determine how the light should be aimed at the other vehicle (e.g., a direction of light based on the location coordinates of the other vehicle). This may include a determination of which of the LEDs 114 need be activated to appropriately illuminate the other vehicle, as shown at step 630. In embodiments where each of the side marker lighting systems 105 work together to provide side marker illumination, such a determination at step 630 may also include determining which of the side marker lighting systems 105 to activate. For example, if the other vehicle is approaching the passenger side of the vehicle, a determination may be made that the front side marker lighting system 105a and the rear side marker lighting system 105b that are located on the passenger side of the vehicle will be activated.

Determining which of the LEDs 114 need to be activated includes accessing data regarding a direction of an individual beam that is emitted from each of the LEDs 114 and determining, based on the data, which individual beams will produce a collective beam that is aimed at the vehicle. As such, data regarding the positioning of each of the LEDs 114 on the substrate 112 must be accessed, as well as data regarding the shape of the substrate 112.

Figure 7A:
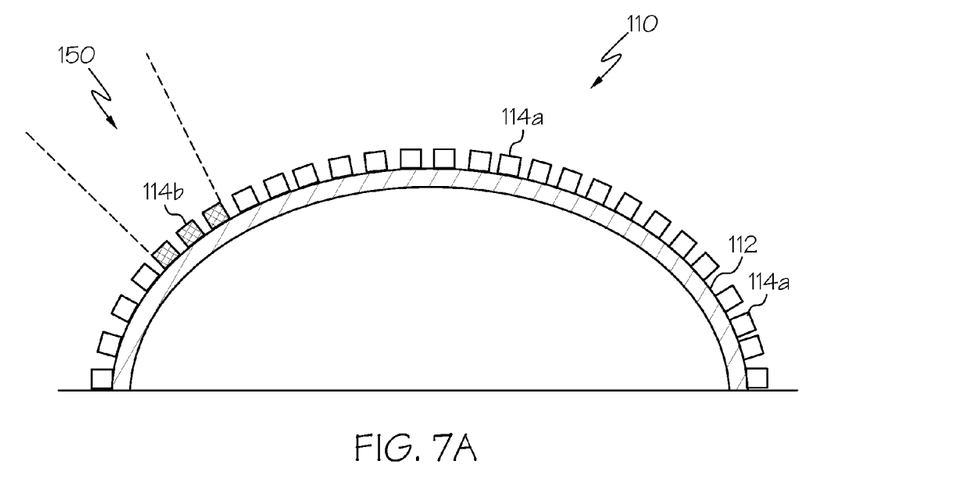
FIG. 7A depicts a cutaway top view of an illustrative side marker lighting system projecting light in a direction according to one or more embodiments shown and described herein.

Such a determination may include determining that not all of the LEDs need be activated to appropriately illuminate the other vehicle. For example, certain LEDs that emit an individual beam that would not be directed at the other vehicle may not be activated, as the light emitted therefrom may be unnecessary, may be directed at other objects, may cause confusion, and/or may temporary blind the driver of the other vehicle. For example, as shown in FIGS. 7A and 7B, the collective beam 150 may be emitted in a particular direction by a grouping of activated LEDs 114b, whereas inactive LEDs 114a do not emit light.

Referring again to FIGS. 1-2 and 6, the determination at step 625 may be completed by the master controller 160, the LED controller 111, or any combination thereof. For example, the master controller 160 may determine which LEDs to activate based on the data received from the sensor modules 120, and transmit instructions to the LED controller 111 for activating the appropriate LEDs 114. In another example, the master controller 160 may direct the LED controller 111 to determine an appropriate LED activation pattern and activate the corresponding LEDs 114.

At step 630, the LEDs 114 to be illuminated according to the determination at step 625 may be activated to cause the other vehicle to be illuminated by the appropriate side marker lighting system(s) 105. Activation of the LEDs 114 may generally be completed by the LED controller 111, as previously described herein. As such, the LED controller 111 of the light emitting module 110 selectively activates the LEDs 114 such that the activated LEDs 114 produce an appropriately directed collective beam 150, as described herein. In embodiments where a plurality of side marker lighting systems 105 are to be activated (e.g., both a front side marker lighting system 105a and a rear side marker lighting system 105b are activated), LED controllers 111 for each of such systems may activate the appropriate LEDs 114. Activation by the LED controller 111 may produce the collective beam 150 directed at the other vehicle, as depicted in FIGS. 7A-7C.

Figure 7B:
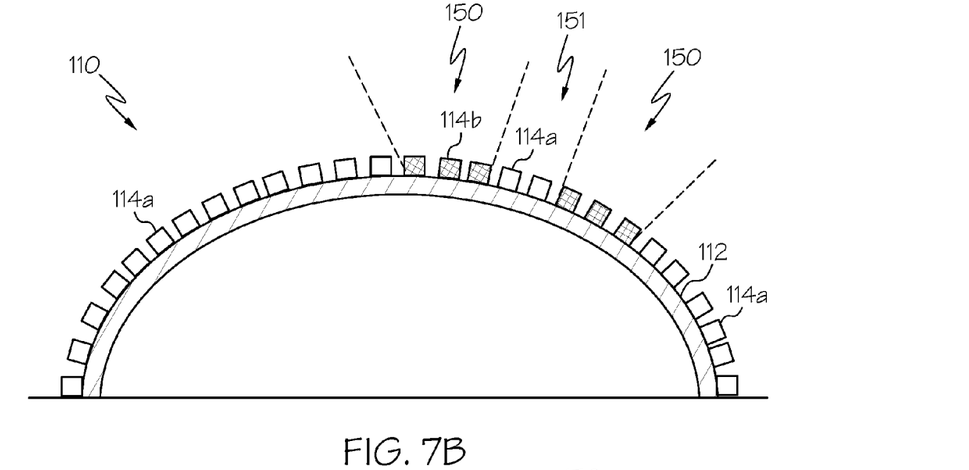
FIG. 7B depicts a cutaway top view of an illustrative side marker lighting system projecting light having a deluminated zone according to one or more embodiments shown and described herein.
Figure 7C:
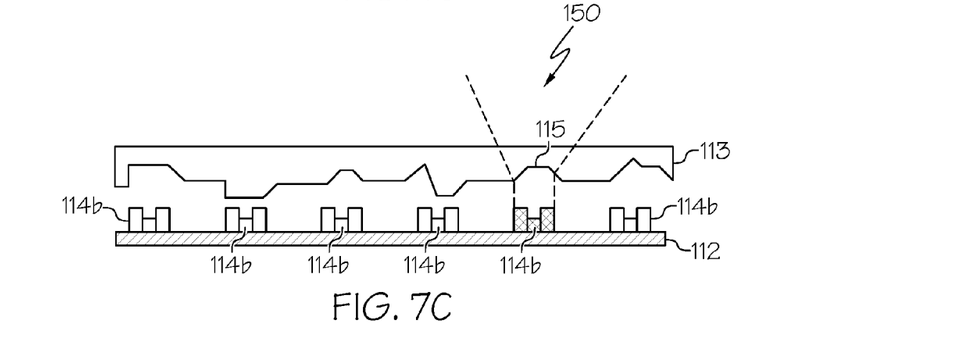
FIG. 7C depicts a cutaway top view of an alternative pedestrian marking system projecting light in a direction according to one or more embodiments shown and described herein.

As particularly depicted in FIG. 7B, in some embodiments, the collective beam 150 may incorporate a deluminated zone 151 therein. The deluminated zone 151 generally corresponds to an area projected onto the other vehicle that is aimed at the driver of the other vehicle and could otherwise temporarily blind the driver of the other vehicle. As such, the LEDs 114 that would project light in the deluminated zone 151 are inactive LEDs 114a so that no light is projected therefrom. As such, while the collective beam 150 illuminates the vehicle, light is not projected directly at the face of the driver of the other vehicle. Determination of a deluminated zone 151 may be completed as a portion of step 625 (FIG. 6) where coordinates of the location of the driver of the other vehicle are also determined in addition to the coordinates of the vehicle. In some embodiments, projecting a deluminated zone 151 within the collective beam 150 may incorporate one or more components and functionality of adaptive driving beam (ADB) systems, as such systems are generally understood.

Referring again to FIGS. 1-2 and 6, at step 640, the side marker lighting systems 105 may continuously monitor the location of the other vehicle with respect to the vehicle 100. Such a monitoring may be necessary to ensure that the collective beam 150 aimed at the vehicle and/or the deluminated zone 151 thereof remains appropriately aimed as the vehicles move with respect to one another. Monitoring may include continuously receiving data from the one or more sensor modules 120 and determining whether the data indicates movement of the other vehicle.

At step 645, if a determination is made that the other vehicle has not moved with respect to the vehicle 100 in which the side marker lighting systems 105 are installed, the process may return to step 640 to continue to monitor the location. If a determination is made that the other vehicle has moved with respect to the vehicle 100 in which the side marker lighting systems 105 are installed, a determination may be made as to whether the other vehicle as moved outside the vicinity in which side marker lighting is necessary at step 650. If the other vehicle has moved outside the vicinity, the illuminated LEDs 114 may be deactivated and the process may return to step 610 to monitor for additional vehicles. If the other vehicle has not moved outside the vicinity, the process may return to step 625 to determine the other vehicle's location, determine which LEDs 114 to activate and activate the appropriate LEDs 114.

Figure 8A:
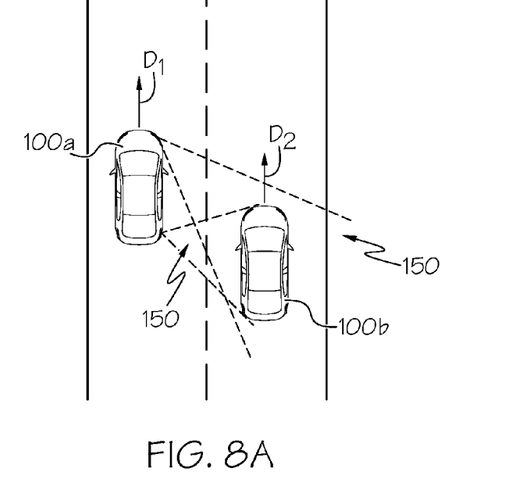
FIG. 8A depicts an illustrative schematic top view of a second vehicle approaching a first vehicle equipped with a side marker lighting system on a two lane highway according to one or more embodiments shown and described herein.
Figures 8B, 8C:
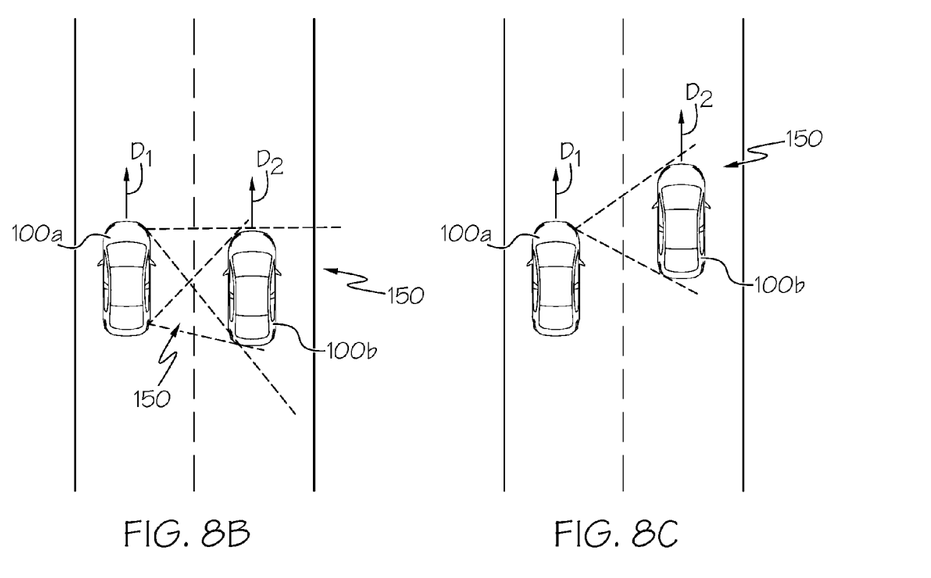
FIG. 8B depicts an illustrative schematic top view of the movement of the side marker lighting system of the first vehicle in FIG. 8A as the second vehicle moves with respect to the first vehicle according to one or more embodiments shown and described herein.
FIG. 8C depicts an illustrative schematic top view of additional movement of the side marker lighting system of the first vehicle in FIG. 8A as the second vehicle moves with respect to the first vehicle according to one or more embodiments shown and described herein.

As a result of the systems and methods described herein, as shown in FIGS. 8A-8C, a first vehicle 100*a* having the side marker lighting systems 105 installed may be traveling in a first direction $D_1$ on a roadway. As a second vehicle 100*b* traveling in a second direction $D_2$ (which may or may not be the same as the first direction $D_1$) approaches the first vehicle 100*a*, the side marker lighting systems 105 may project one or more collective beams 150 onto the second vehicle 100*b* and continuously adjust which LEDs are active such that the collective beams 150 continue to illuminate the second vehicle 100*b*, even as the second vehicle 100*b* moves with respect to the first vehicle 100*a*.

Accordingly, the side marker lighting systems and methods described herein determine a location and a movement of another vehicle, project a beam of light from the side marker lights towards the other vehicle to notify the driver of the other vehicle, and move the projected beam of light as the other vehicle changes in position with respect to the system. In addition, the beams of light projected from the side marker lights are particularly aimed such that they do not temporarily blind the driver of the other vehicle and/or so that they do not emit light towards areas other than the other vehicle. Movement of the light beam projected by the side marker lights is achieved by using a plurality of LEDs that are particularly positioned and selectively activated according to the desired location of the light.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A side marker lighting system comprising:
   a light emitting module comprising a plurality of light emitting diodes;
   a sensor module; and
   a master controller comprising a non-transitory, processor-readable storage medium storing one or more machine-readable instructions to:
   receive data from the sensor module, wherein the data is indicative of a vehicle located in the vicinity of the side marker lighting system,
   determine that the vehicle is moving toward the side marker lighting system at an angle,
   determine location coordinates of the vehicle with respect to the side marker lighting system,
   determine a direction of light based on the location coordinates of the vehicle such that the direction of light is aimed at the vehicle, and
   direct the light emitting module to selectively activate the plurality of light emitting diodes such that the plurality of light emitting diodes produce a collective beam that corresponds to the direction of light.

2. The side marker lighting system of claim 1, wherein the non-transitory, processor-readable storage medium further stores one or more machine-readable instructions to:
   determine second location coordinates of the vehicle with respect to the side marker lighting system when the vehicle moves with respect to the side marker lighting system to an area outside of the direction of light;
   determine a second direction of light based on the second location coordinates such that the second direction of light is aimed at the vehicle; and
   direct the light emitting module to selectively activate the plurality of light emitting diodes such that the plurality of light emitting diodes produce the collective beam that corresponds to the second direction of light.

3. The side marker lighting system of claim 1, the non-transitory, processor-readable storage medium further stores one or more machine-readable instructions to:
   determine that the vehicle has moved outside the vicinity of the side marker lighting system; and
   direct the light emitting module to deactivate the plurality of light emitting diodes.

4. The side marker lighting system of claim 1, wherein the non-transitory, processor-readable storage medium further stores one or more machine-readable instructions to:
   activate the side marker lighting system based on at least one of a power on of a vehicle in which the side marker lighting system is installed, a detected ambient light level, and an activation of a headlight switch.

5. The side marker lighting system of claim 1, wherein the collective beam comprises a deluminated zone that corresponds to an area projected onto the vehicle that is aimed at a driver of the vehicle.

6. The side marker lighting system of claim 1, wherein the light emitting module comprises the plurality of light emitting diodes arranged on a curved surface positioned such that each of the plurality of light emitting diodes is particularly positioned according to a curvature of the curved surface.

7. The side marker lighting system of claim 1, wherein the side marker lighting system is one or more of a front side marker lighting system and a rear side marker lighting system.

8. The side marker lighting system of claim 1, wherein the light emitting module further comprises an LED controller for selectively activating the plurality of light emitting diodes.

9. The side marker lighting system of claim 1, wherein the sensor module comprises an imaging device that images an area adjacent to the side marker lighting system.

10. A method of providing side marker lighting, the method comprising:
    receiving, by a master controller of a side marker lighting system, data from a sensor module, wherein the data is indicative of a vehicle located in the vicinity of the side marker lighting system;
    determining, by the master controller, that the vehicle is moving toward the side marker lighting system at an angle;

determining, by the master controller, location coordinates of the vehicle with respect to the side marker lighting system;

determining, by the master controller, a direction of light based on the location coordinates of the vehicle such that the direction of light is aimed at the vehicle; and directing, by the master controller, a light emitting module to selectively activate a plurality of light emitting diodes such that the plurality of light emitting diodes produce a collective beam that corresponds to the direction of light.

11. The method of claim 10, further comprising:

determining, by the master controller, second location coordinates of the vehicle with respect to the side marker lighting system when the vehicle moves with respect to the side marker lighting system to an area outside of the direction of light;

determining, by the master controller, a second direction of light based on the second location coordinates such that the second direction of light is aimed at the vehicle; and directing, by the master controller, the light emitting module to selectively activate the plurality of light emitting diodes such that the plurality of light emitting diodes produce the collective beam that corresponds to the second direction of light.

12. The method of claim 10, further comprising:

determining, by the master controller, that the vehicle has moved outside the vicinity of the side marker lighting system; and directing, by the master controller, the light emitting module to deactivate the plurality of light emitting diodes.

13. The method of claim 10, further comprising:

activating, by the master controller, the side marker lighting system based on at least one of a power on of a vehicle in which the side marker lighting system is installed, a detected ambient light level, and an activation of a headlight switch.

14. The method of claim 10, wherein directing the light emitting module to selectively activate the plurality of light emitting diodes such that the plurality of light emitting diodes produce a collective beam that corresponds to the direction of light comprises directing the light emitting module to selectively activate the plurality of light emitting diodes such that the plurality of light emitting diodes produce the collective beam comprising a deluminated zone that corresponds to an area projected onto the vehicle that is aimed at a driver of the vehicle.

15. The method of claim 10, wherein determining the location coordinates of the vehicle comprises receiving data from the sensor module and mapping the location of the vehicle to coordinate axes based on the data.

16. The method of claim 10, wherein directing the light emitting module to selectively activate a plurality of light emitting diodes comprises:

determining, for each of the plurality of light emitting diodes, a second direction of an individual beam emitted from each of the plurality of light emitting diodes, wherein the second direction is different for each individual beam;

determining a first portion of the plurality of light emitting diodes, wherein the first portion comprises one of the plurality of light emitting diodes that emit an individual beam that corresponds to the direction of light; and directing the light emitting module to activate only the first portion of the light emitting diodes to produce the collective beam.

17. A first vehicle comprising a side marker lighting system, the side marker lighting system comprising:

a light emitting module comprising a plurality of light emitting diodes and an LED controller for selectively activating one or more of the plurality of light emitting diodes in a pattern to produce a particularly aimed collective beam of light;

a sensor module; and a master controller comprising a processing device and a non-transitory, processor-readable storage medium, the non-transitory, processor-readable storage medium comprising one or more programming instructions that, when executed, cause the processing device to:

receive data from the sensor module, wherein the data is indicative of a second vehicle located in the vicinity of the first vehicle, determine that the second vehicle is moving toward the first vehicle at an oblique angle, determine first location coordinates of the second vehicle with respect to the first vehicle, determine a first direction of light based on the first location coordinates of the second vehicle such that the first direction of light is aimed at the second vehicle, direct the LED controller to selectively activate the plurality of light emitting diodes such that the plurality of light emitting diodes produce a collective beam that corresponds to the first direction of light, and when the second vehicle moves with respect to the first vehicle to an area outside of the fist direction of light:

determine second location coordinates of the second vehicle with respect to the first vehicle, determine a second direction of light based on the second location coordinates such that the second direction of light is aimed at the second vehicle, and direct the light emitting module to selectively activate the plurality of light emitting diodes such that the plurality of light emitting diodes produce the collective beam that corresponds to the second direction of light.

18. The first vehicle of claim 17, wherein the non-transitory, processor-readable storage medium further comprises one or more programming instructions that, when executed, cause the processing device to:

determine that the second vehicle has moved outside the vicinity of the first vehicle; and direct the LED controller to deactivate the plurality of light emitting diodes.

19. The first vehicle of claim 17, wherein the non-transitory, processor-readable storage medium further comprises one or more programming instructions that, when executed, cause the processing device to:

activate the side marker lighting system based on at least one of a power on of the first vehicle, a detected ambient light level, and an activation of a headlight switch.

20. The first vehicle of claim 17, wherein the collective beam comprises a deluminated zone that corresponds to an area projected onto the second vehicle that is aimed at a driver of the second vehicle.

* * * * *